US006596702B2

(12) United States Patent
Kampinga et al.

(10) Patent No.: US 6,596,702 B2
(45) Date of Patent: *Jul. 22, 2003

(54) COMPOSITIONS FOR USE IN REHYDRATION AND NUTRITION DURING ATHLETIC EXERCISE AND METHODS OF MAKING SAME

(75) Inventors: Jaap Kampinga, Groningen (NL); Camilo Colaco, Trumpington (GB)

(73) Assignee: Elan Drug Delivery Limited, Nottingham (GB)

(*) Notice: Subject to any disclaimer, the term of this patent is extended or adjusted under 35 U.S.C. 154(b) by 0 days.

This patent is subject to a terminal disclaimer.

(21) Appl. No.: 10/161,855

(22) Filed: Jun. 3, 2002

(65) Prior Publication Data

US 2002/0150666 A1 Oct. 17, 2002

Related U.S. Application Data

(63) Continuation of application No. 08/899,012, filed on Jul. 23, 1997, now Pat. No. 6,455,511, which is a continuation of application No. 08/310,681, filed on Sep. 22, 1994, now abandoned.

(51) Int. Cl.$^7$ .................. A61K 31/715; A61K 31/70
(52) U.S. Cl. .................. 514/53; 514/23; 514/25; 514/54; 514/58; 424/439; 426/66; 426/67; 426/648; 426/658; 426/810
(58) Field of Search .................. 514/53, 23, 25, 514/54, 58; 424/439

(56) References Cited

U.S. PATENT DOCUMENTS

| | | |
|---|---|---|
| 3,557,717 A | 1/1971 | Chivers |
| 3,619,294 A | 11/1971 | Black et al. |
| 3,632,357 A | 1/1972 | Childs |
| 3,655,442 A | 4/1972 | Schwer et al. |
| 4,127,502 A | 11/1978 | Li Mutti et al. |
| 4,158,544 A | 6/1979 | Louderback |
| 4,327,076 A | 4/1982 | Puglia et al. |
| 4,327,077 A | 4/1982 | Puglia et al. |
| 4,588,744 A | 5/1986 | McHugh |
| 4,596,825 A | 6/1986 | Suda et al. |
| 4,701,417 A | 10/1987 | Portenhauser et al. |
| 4,762,857 A | 8/1988 | Bollin, Jr. et al. |
| 4,853,237 A | 8/1989 | Prinkkila et al. |
| 4,865,871 A | 9/1989 | Livesey et al. |
| 4,871,550 A | 10/1989 | Millman |
| 4,879,280 A | 11/1989 | Seyffart et al. |
| 4,883,762 A | 11/1989 | Hoskins |
| 4,891,319 A | 1/1990 | Roser |
| 5,026,566 A | 6/1991 | Roser |
| 5,032,411 A | 7/1991 | Stray-Gundersen |
| 5,114,723 A | 5/1992 | Stray-Gundersen |
| 5,149,653 A | 9/1992 | Roser |
| 5,185,166 A | 2/1993 | Nakagawa et al. |

(List continued on next page.)

FOREIGN PATENT DOCUMENTS

| | | |
|---|---|---|
| CA | 1268659 | 5/1990 |
| CA | 2013820 | 10/1991 |
| CA | 2089241 | 8/1993 |
| EP | 0 223 540 | 5/1987 |
| EP | 0 297 887 | 1/1989 |
| EP | 0 356 154 | 2/1990 |
| EP | 0 364 053 | 4/1990 |
| EP | 0 415 567 | 3/1991 |
| EP | 0 532 807 | 3/1993 |
| EP | 0 587 972 | 3/1994 |
| EP | 0 619 951 | 10/1994 |
| EP | 0 714 905 | 6/1996 |
| GB | 1 381 588 | 1/1975 |
| GB | 2 206 273 | 1/1989 |
| GB | 2 287 234 | 9/1995 |
| JP | 58-16695 | 12/1983 |
| JP | 06-70718 | 3/1994 |
| JP | 06-072883 | 3/1994 |
| JP | 06-311874 | 11/1994 |
| WO | WO 87/00196 | 1/1987 |
| WO | WO 89/06542 | 7/1989 |
| WO | WO 90/02494 | 3/1990 |
| WO | WO 92/02133 | 2/1992 |
| WO | WO 93/02834 | 2/1993 |
| WO | WO 93/10758 | 6/1993 |
| WO | WO 93/11220 | 6/1993 |
| WO | WO 95/06126 | 3/1995 |
| WO | WO 95/33488 | 12/1995 |
| WO | WO 96/03978 | 2/1996 |
| WO | WO 96/05809 | 2/1996 |
| WO | WO 96/08979 | 3/1996 |
| WO | WO 98/41188 | 9/1998 |

OTHER PUBLICATIONS

Akio, T. et al. (1986). *Handbook of Natural Products for Food Processing*, Ninth Edition, Syokuhin–to–Kagakusha K. K. Total pages 7. (English Translation).

Belfiore, F. et al. (1973). "Serum Enzymes in Diabetes Mellitus" *Clin. Chem.* 19(5):447–452.

Bergoz, R. et al. (1981). "Significance of Duodenal Diaccharidases: A Comparative Study of Duodenal and Jejunal Values" *Digestion* 22:108–112.

Blakeley, D. et al. (Oct. 1990). "Dry Instant Blood Typing Plate for Bedside Use" *Lancet* 336:854–855.

Chen, C–C. et al. (1987). "Rat Intestinal Trehalase: Studies of the Active Site" *Biochem. J.* 247:715–724.

Colaço, C. et al. (Sep. 1992). "Extraordinary Stability of Enzymes Dried in Trehalose: Simplified Molecular Biology" *Bio/Tech.* 10:1007–1011.

(List continued on next page.)

*Primary Examiner*—James O. Wilson
(74) *Attorney, Agent, or Firm*—Morrison & Foerster LLP

(57) ABSTRACT

The invention provides sports beverages which supply a readily metabolizable, natural carbohydrate, trehalose. The use of trehalose provides twice the concentration of glucose molecules for immediate energy compared to monosaccharide solutions of the same osmolarity.

30 Claims, No Drawings

U.S. PATENT DOCUMENTS

| | | | |
|---|---|---|---|
| 5,218,096 | A | 6/1993 | Shibuya et al. |
| 5,290,765 | A | 3/1994 | Wettlaufer et al. |
| 5,306,506 | A | 4/1994 | Zema et al. |
| 5,336,510 | A | 8/1994 | Chang |
| 5,348,852 | A | 9/1994 | Bonderman |
| 5,422,384 | A | 6/1995 | Samuels et al. |
| 5,425,951 | A | 6/1995 | Goodrich, Jr. et al. |
| 5,443,830 | A | 8/1995 | Moore et al. |
| 5,512,547 | A | 4/1996 | Johnson et al. |
| 5,589,167 | A | 12/1996 | Cleland et al. |
| 5,621,094 | A | 4/1997 | Roser et al. |
| 5,728,574 | A | 3/1998 | Legg |
| 5,766,520 | A | 6/1998 | Bronshtein |
| 5,955,448 | A | 9/1999 | Colaco et al. |
| 5,993,805 | A | 11/1999 | Sutton et al. |
| 6,455,511 | B1 * | 9/2002 | Kampinga et al. ............ 514/53 |
| 2001/0055583 | A1 | 12/2001 | Roser et al. |

OTHER PUBLICATIONS

Colaço, et al. (1992). "Trehalose Stabilisation of Biological Molecules," *Biotechnol. Internat.* pp. 345–350.

Encyclopaedia Chimica, panel of Kagaku–Daijiten, Ed., vol. 7. pp. 310, 311 and English translation (1964).

Doubt, T. J. et al. (1994). "Fluid Ingestion During Exercise in 25° C. Water at the Surface and 5.5 ATA" *Med. and Sci. in Sports and Exer.* pp. 75–80.

Eze, L. C. (1989). "Plasma Trehalase Activity and Diabetes Mellitus" *Biochem. Genet* 27(9/10): 487–495.

Galand, G. (1989). "Brush Border Membrane Sucrase–Isomaltase, Maltase–Glucoamylase and Trehalase in Mammals: Comparative Development, Effects of Glucocorticoids, Molecular Mechanisms, and Phylogenetic Implications" *Comp. Biochem. Physiol.* 94B(1):1–11.

Kanna et al., (1974) "Denaturation of Fish Muscle Protein by Dehydration—V." *Bull. Tokai Reg. Fish. Res. Lab.* 77:1–17.

Kramers, T. C. and Catovsky, D. (1978). "Cell Membrane Enzymes: L–γ–Glutamyl Transpeptidase, Leucine Aminopeptidase, Maltase and Trehalase in Normal and Leukaemic Lymphocytes" *Brit. J. Haematol.* 38:453–461.

Madzarovová–Nohejlova, J. (Jul. 1973). "Trehalase Deficiency in a Family," *Gastroenterol.* 65(1):130–133.

Maestracci, D. (1976). "Enzymic Solubilization of the Human Intestinal Brush Border Membrane Enzymes," *Biochim. Biophys. Acta* 433:469–481.

Mason, W. L. et al. (1993). "Carbohydrate Ingestion During Exercise: Liquid vs. Solid Feedings," *Med. and Sci. in Sports and Exe.* pp. 966–969.

Noakes, T. (1993). "Fluid Replacement During Exercise" *Exercise and Sport Science Reviews.* vol. 21, Holloszy, J.O., ed., Williams & Wilkins Baltimore, pp. 297–330.

Ravich, W. J. and Bayless, T. M. (1983). "Carbohydrate Absorption and Malabsorption," *Clin. Gastroenterol.* 12:335–356.

Rehrer, N. J. et al. (1993). "Effects of Eectrolytes in Carbohydrate Beverages on Gastric Emptying and Secretion," *Med. and Sci. in Sports and Exer.* pp. 42–51.

Riby, J. and Galand, G. (1985). "Rat Intestinal Brush Border Membrane Trehalase: Some Properties of the Purified Enzyme," *Comp. Biochem. Physiol.* 82B(4):821–827.

Roser, R. and Colaco, C. (May 1993). "A Sweeter Way to Fresher Food," *New Scientist* pp. 25–28.

Roser, (1991). "Trehalose Drying: A Novel Replacement for Freeze Drying," *BioPharm.* 4:47–53.

Roser, B. (Jul. 1991). "Trehalose, A New Approach to Premium Dried Foods," *Trends in Food Sci. and Technol.* pp. 166–169.

Sacktor, B. (1968). "Trehalase and the Transport of Glucose in the Mammalian Kidney and Intestine," *Proc. Natl. Acad. Sci. USA* 60:1007–1012.

Sakurai, Y. (ed) (1986) "Sogo Shokuhin Jiten" *Comprehensive Food Dictionary,* Sixth Edition, published by Dobun Shoin, Tokyo, Japan, pp. 203–204 (Dried Eggs), 208 (Dried Eggs, or Dehydrated Eggs), and 572 (Protein Denaturation), English translation provided pp. 1–9.

Sawka, M. N. and Greenleaf, J. E. (1992). "Current Concepts Concerning Thirst, Dehydration, and Fluid Replacement:Overview," *Med. and Sci. in Sports and Exer.* 24(6):643–644.

Supplement of Reasons for Opposition of Japanese patent application No. 61–503940, pp. 1–23 (Jan., 1996) with English translation.

Summary of Reasons for Opposition to Japanese Patent Application No. 63–505533, pp. 1–5 (Mar. 15, 1994) with English translation.

Grounds of Decision for Opposition of Japanese Patent Application No. 63–505533, pp. 1–6 (Jul., 1996) with English translation.

Toyama, A. (ed), (1986) *Handbook of Natural Product for food processing,* 9th Edition, Osaka, Japan, Shokuhin to Kagaku Sha, pp. 384 and 495 (ISBN4–87994–048–8).

Wang, Y. J. and Pearlman, R. eds (1993). *Stability and Characterization of Protein and Peptide Drugs.* Plenum Press, New York and London, Table of Contents pp. xv–xxi.

Yoshida, K. et al. (1993). "Serum Trehalase Activity in Patients with Rheumatoid Arthritis," *Clin. Chim. Acta* 215:123–124.

* cited by examiner

COMPOSITIONS FOR USE IN REHYDRATION AND NUTRITION DURING ATHLETIC EXERCISE AND METHODS OF MAKING SAME

CROSS REFERENCE TO RELATED APPLICATIONS

This application is a continuation of U.S. patent application Ser. No. 08/899,012, filed Jul. 23, 1997 now U.S. Pat. No. 6,455,511, which is a continuation of U.S. patent application Ser. No. 08/310,681 filed Sep. 22, 1994 now abandoned, the disclosures of each of which are incorporated herein by reference in their entirety.

FIELD OF THE INVENTION

The invention relates to compositions for sports beverages containing an amount of trehalose ($\alpha$,D-glucopyranosyl $\alpha$,D-glucopyranoside) sufficient to produce an isotonic or hypotonic solution. Suitable salts, amino acids, flavorings, colorings etc. may also be added as may a variety of additional carbohydrates.

BACKGROUND OF THE INVENTION

A wide variety of sports beverages are available for replenishing fluids, nutrients and salts during exercise. Carbohydrates not only replace energy sources but also facilitate transport of salts through the wall of the intestinal tract and enhance the concomitant passage of water. A wide variety of carbohydrates are also used to sweeten, adjust osmolarity and provide a timed release form of glucose. Glucose is often the carbohydrate of choice as it is the principal form of sugar in blood. The nutrients are usually in the form of amino acid residues to prevent breakdown of muscle tissues during extreme exercise. Fats, peptides and proteins are difficult to digest and therefore not generally useful in such beverages. A wide variety of salts and minerals are generally added to sports beverages to enhance fluid uptake and to replace the electrolyte balance disrupted by loss of fluids by perspiration during exercise. The actual ability of salts to maintain electrolyte balance has been disputed and some sports beverages do not contain them. For a review of the importance of hydration during exercise, see Noakes, "Fluid Replacement During Exercise" in Exercise and Sport Science Reviews, Vol. 21, Holloszy ed. (1993) pp. 297–330.

Original sports beverages were hypertonic (>300 mOsm) in order to deliver the greatest concentration of carbohydrates to athletes. It was found that hypertonic beverages, however, caused fluid to flow into the intestines, causing pressure, pain and increased peristalsis which results in diarrhea and increased dehydration. Most sports beverages are now isotonic or slightly hypotonic. Osmolarity is maintained by adjusting the amount of monosaccharides and, in some cases higher glucose polymers.

Canadian Patent Application No. 2,013,820 describes sports beverages containing ten percent by weight of carbohydrates which are a mixture of mono-, di- and polysaccharides which are derived from desalinated and hydrolyzed whey concentrate. European Patent Application Publication No. 587,972 describes a sports beverage without added sugar or artificial sweetener which derives its carbohydrates from fruit juice. European Patent Specification Publication No. 223,540 describes a high energy hypotonic sports beverage containing free glucose and/or sucrose and glucose polymers. The preferred glucose polymers have a degree of polymerization between 4 and 15 and provide a timed release source of glucose. Such polymers of glucose may increase the number of glucose molecules which can be placed in an isotonic solution but do not provide an immediate source of energy as they must be processed over time to individual glucose molecules which are then absorbed through the intestinal tract.

Sports beverages are provided in liquid formulations for immediate ingestion and in dry or concentrated formulations which must be mixed with water prior to ingestion. Commonly, the dry components are simply mixed together for subsequent-rehydration. U.S. Pat. No. 4,871,550 provides a method of producing a dry formulation comprising dry blending in separate batches the various factors and then blending the separate batches together to produce a powder which is more easily dissolved in water.

It would be useful to provide higher concentrations of a readily assimilable form of glucose in a sports beverage without producing a hypertonic sports beverage.

All references cited herein are hereby incorporated by reference.

SUMMARY OF THE INVENTION

The present invention provides sports beverage formulations containing trehalose as the major carbohydrate source and various salts, nutritional components and other additives. The sports beverages are provided in various forms including powders; liquids, both full strength and concentrated, as well as carbonated and non-carbonated; and tablets. Methods of making the formulations include various forms of preparing powders from an aqueous solution of trehalose and any additional components.

DETAILED DESCRIPTION OF THE INVENTION

Trehalose, $\alpha$-D-glucopyranosyl-$\alpha$-D-glucopyranoside, is a naturally occurring, non-reducing disaccharide initially found associated with the prevention of desiccation damage in certain plants and animals which dry out without damage and revive when rehydrated. Trehalose has been shown to be useful in preventing denaturation of proteins, viruses and foodstuffs during desiccation. See U.S. Pat. Nos. 4,891,319; 5,149,653; 5,026,566; Blakeley et al. (1990) Lancet 336:854–855; Roser (July 1991) Trends in Food Sci. and Tech. 166–169; Colaco et al. (1992) Biotechnol. Internat., 345–350; Roser (1991) BioPharm. 4:47–53; Colaco et al. (1992) Bio/Tech. 10:1007–1011; and Roser et al. (May 1993) New Scientist, pp. 25–28.

Trehalose is found extensively in such diverse animal and plant species as bacteria, yeasts, fungi, insects and invertebrates. In insects, it is the major blood sugar. On a routine basis, it is not found in humans, as the only major regular dietary source for man is in certain strains of edible mushrooms. Madzarovova-Nohejlova (1973) Gastroenterology 65:130–133.

Trehalose is described for use in a peritoneal dialysis system in U.S. Pat. No. 4,879,280 where it is mentioned as one of several disaccharides as a replacement for the prior art system which utilized glucose. Trehalose is mentioned for use in the dialysis system as a disaccharide that will not be readily cleaved to glucose and thus avoid raising the blood glucose level. Trehalose has also been described as suitable for use in parenteral formulations primarily because it can be sterilized by autoclaving without the browning associated with conventional parenteral formulations. Japanese Patent No. 6-70718.

Neotrehalose (O-α-D-glucopyranosyl β-D-glucopyranoside or O-β-D-glucopyranosyl α-D-glucopyranoside) has been described for use in foods and beverages because of its sweetness and rapid absorption by the intestines. Canadian Patent Application No. 2,089,241 and U.S. Pat. No. 5,218,096. Trehalose is described as being unsuitable for such use on the grounds that trehalose is not readily hydrolyzed by enzymes such as amylases, not readily metabolized and absorbed by the human body and "does not release energy in a living body."

Trehalose is not a major component of the human diet, and therefore little in the way of specific information is available on the effects of ingested trehalose. However, information is available on its metabolism. Following oral ingestion, trehalose is not absorbed, as only monosaccharides can pass the intestinal epithelium. Ravich and Bayless (1983) *Clin. Gast.* 12:335–356. Trehalose is metabolized by the enzyme trehalase into two molecules of glucose. Sacktor (1968) *Biochem.* 60:1007–1012. Trehalase is a normal constituent of most mammalian bodies, including humans, and has been identified in human serum, lymphocytes and the liver, but is principally located in the brush border of both the intestinal tract and the renal proximal tubules. Belfiore et al. (1973) *Clin. Chem.* 19:447–452; Eze (1989) *Biochem. Genet.* 27:487–495; Yoshida et al. (1993) *Clin. Chim. Acta* 215:123–124; and Kramers and Catovsky (1978) *Brit. J. Haematol.* 38:453–461. Trehalase is a membrane-bound protein found in the human and animal intestinal tract. Bergoz et al. (1981) *Digestion* 22:108–112; Riby and Garland (1985) *Comp. Biochem. Physiol.* 82B:821–827; and Chen et al. (1987) *Biochem. J.* 247:715–723.

The process by which intestinal trehalase metabolizes exogenous trehalose has been described. Intestinal hydrolases, such as trehalase, are surface components attached to the external side of the luminal membrane microvilli, and may be anchored to the membrane by phosphatidylinositol. Maestracci (1976) *Biochim. et Biophys. Acta* 433:469–481; and Galand (1989) *Comp. Biochem Physiol.* 94B:1–11. Trehalose is hydrolyzed on the brush border surface of the enterocyte, where the two subsequent glucose molecules are released in close proximity to the membrane. Ravich and Bayless (1983). There, glucose molecules are absorbed by an active rather than a passive transport system. This physiological function was originally described in conjunction with others sugars as "membrane contact digestion." Thus, the disaccharide trehalose cannot be absorbed across the luminal membrane and likely explains why it has not been identified in human plasma.

It has now been found that, in spite of the inability of trehalose to be absorbed across the intestine and its breakdown to glucose by trehalase in the intestine, it is suitable for use in sports beverages where it is preferred that isotonicity or hypotonicity of the beverage be maintained within the intestine. Thus the active transport of the glucose molecules produced by trehalase allows trehalose to be metabolized to glucose prior to absorption, and then normal physiological pathways metabolize the glucose. Without the active transport of glucose produced on the breakdown of trehalose, the intestinal concentration of glucose would increase resulting in an increase of osmolarity and subsequent discomfort.

The use of trehalose as the primary carbohydrate source in sports beverages does not increase the osmolarity of the intestinal contents upon breakdown by trehalase, provides blood glucose levels two-fold over that of glucose alone and does not cause the delay in increasing blood glucose levels as when glucose polymers or other, non-glucose, carbohydrates are used. Trehalose also provides the advantage that it has a pleasant flavor which is not excessively sweet, does not produce an unpleasant mouthfeel upon ingestion and encourages greater fluid intake. Unlike synthetic sugars such as neotrehalose, trehalose is made by a wide variety of organisms and has been found to be well tolerated by humans. Trehalose is also rapidly and completely dissolved in water and thus provides an exceptionally clear sports beverage. Many commercially available sports beverages are cloudy or contain particulate matter; the use of trehalose avoids these drawbacks. The use of trehalose also allows the beverage to be carbonated. Other advantages of the use of trehalose will be discussed herein.

In one embodiment, the present invention encompasses ready-to-drink sports beverages in aqueous solution. The sports beverages contain as their primary source of carbohydrate trehalose. Preferably, the concentration of trehalose and any other carbohydrates is sufficient to obtain an isotonic or slightly hypotonic solution, although hypertonic or slightly hypertonic formulations may be provided. Preferably, trehalose and other solutes are present in an amount sufficient to provide an isotonic or slightly hypotonic solution. If trehalose is the sole solute, the concentration required to obtain an isotonic solution is 300 mM. A 1 molar solution of trehalose results in a solution with an osmolarity of 1665 mOsm. 11.34 g of trehalose dihydrate dissolved in distilled deionized water to a final volume of 100 mL results in an isotonic solution with an osmolarity of 300 mOsm. Preferably the concentration of trehalose is 150 mM to 400 mM. More preferably the concentration is 250 mM. The beverage should be 300 mOsm or less; thus, if the concentration of trehalose is insufficient to attain 30 mOsm, additional carbohydrates or salts may be added to increase the osmolarity.

Trehalose is available in food grade from a variety of sources, these include, but are not limited to, yeast. Other suitable carbohydrates include mono-, di- and polysaccharides. Suitable monosaccharides include, but are not limited to, fructose, mannose, glucose and galactose. Suitable disaccharides include, but are not limited to, sucrose, maltose and lactose. Suitable polysaccharides include, but are not limited to, maltodextrins and those described in European Patent Specification Publication No. 223,540.

Suitable salts include, but are not limited to, sodium, potassium, magnesium and calcium. European Patent Application Publication No. 587,972 provides an extensive discussion of such salts and suitable concentrations thereof. Suitable sources of the salts include, but are not limited to, sodium chloride, potassium phosphate, potassium citrate, magnesium succinate and calcium pantothenate. Salts are optional, and, as discussed above, are primarily beneficial in increasing fluid intake by the intestinal tract. Thus, the amount of salts added is preferably suitable to affect an increase in fluid intake without resulting in an unpalatable drink.

In addition to carbohydrates and salts, the sports beverage may also contain various other nutrients. These include, but are not limited to, vitamins, minerals, amino acids, peptides and proteins. Suitable vitamins include, but are not limited to, vitamin C, the B vitamins, pantothenic acid, thiamin, niacin, niacinamide, riboflavin, iron and biotin. Minerals include, but are not limited to, chromium, magnesium and zinc. Preferably, amino acids are included rather than peptides and proteins which require digestion prior to absorption. Suitable amino acids include, but are not limited to, the twenty amino acids utilized by humans. U.S. Pat. No. 4,871,550 discusses preferred amino acids. The effective amounts of the various nutrients are known in the art and are not described in detail herein.

Other ingredients including, but not limited to, coloring, flavor, artificial sweeteners and preservatives may also be added. Suitable amounts and types of all ingredients described herein are known in the art and are not described in detail herein. It is within the skill of one in the art to prepare a beverage formulation having suitable concentrations of all the components.

The sports beverage is available in several compositions. In one embodiment, the composition is a ready-to-drink aqueous solution that can be packaged in single serving or larger containers. The components are mixed together in sterile, filtered, or carbonated water and packaged for sale. In another embodiment, the components are mixed in an aqueous solution in a concentrated form. An aliquot of the concentrated solution is then mixed with a premeasured amount of water to prepare the beverage. In another embodiment, the composition is a dry powder form in which the dried components are mixed together and milled or mixed in aqueous solution and dried by one of the methods described below. An aliquot of the dried components is mixed with a premeasured amount of water to prepare the beverage. The dry powder may be loose or fashioned into tablets which can be easily added to a premeasured amount of water to prepare the beverage.

The invention also encompasses methods of making the sports beverages. The use of trehalose allows heating of the components in solution to a high temperature, at least briefly, without losing activity of other nutrients, without aggregation of other nutrients and without the browning found with many carbohydrates. Thus, the liquid formulations, both ready-to-use and concentrated, can be sterilized by heat treatment to inhibit contamination and increase shelf-life. Products made with trehalose and sterilized have an almost indefinite shelf-life while most available sports beverages have a shelf-life of only a few months or less due to contamination and/or aggregation of the components.

Previously, dried powders of sports beverages were merely mixed together in their dry form and milled to achieve a homogeneous powder. The milling has also been performed in separate steps for enhancing the solubility of the final composition. U.S. Pat. No. 4,871,550. The use of trehalose allows the components to be mixed in solution, heated to form a uniform dispersion and dried. The heating may also be used to form a sterile solution. Drying may be by any suitable method, including, but not limited to, spray drying, freeze drying, fluidized-bed drying and critical fluid extraction. One approach is to spray dry using precision nozzles to produce extremely uniform droplets in a drying chamber. Suitable machines include, but are not limited to, Buchi and Lab-plant spray driers used according to the manufacturers' instructions.

Aliquots of the dried formulations are mixed with a premeasured amount of water to obtain the desired concentration of solutes. The use of trehalose provides powder which disperses almost immediately and completely in water. Many commercially available powders are hygroscopic and do not mix rapidly or completely with water. The use of trehalose thus avoids long mixing times and the waste common to prior art mixtures. Due to the increased solubility of trehalose formulations, the dried formulations can also be pressed into tablet form. The tablet form avoids the necessity of measuring loose powder and allows the rapid preparation of the sports beverages. For instance, an athlete can carry the tablets during sporting events and add them to water provided during the event. This is particularly helpful during endurance events such as marathons and triathlons where water may be provided but food or other nutrition is not.

The following examples are meant to illustrate but not limit the invention.

EXAMPLES

Example 1

5.0 to 11.34 g of trehalose dihydrate is dry blended at an rpm greater than 18,000 until the consistency of is a uniform powder. Thereafter, the trehalose dihydrate is dissolved in distilled deionized water to a final volume of 100 mL and an osmolarity of 300 mOsm or less. For 11.34 g of trehalose the measured value was 287 mOsm. Measurement of the osmolarity of the final mixture is made on a Roebling Micro-Osmometer.

Example 2

5.0 to 11.34 g of trehalose dihydrate is again dry blended at an rpm greater than 18,000 until the consistency is a uniform powder. Between 100 and 500% of the recommended daily allowance of vitamins and minerals is added to the trehalose powder, and the mixture is dry blended again until the milling action reduces the particle size to less than 50 $\mu$m. Thereafter, the mixture is dissolved to a final volume of 100 mL. Measurement of the osmolarity of the final mixture is made on a Roebling Micro-Osmometer.

Example 3

5.0 to 11.34 g of trehalose dihydrate is again dry blended at an rpm greater than 18,000 until the consistency is a uniform powder. Between 100 and 500% of the recommended daily allowance of vitamins and minerals is added to the trehalose powder. An effective amount of sodium chloride and potassium phosphate are added in order to increase the fluid uptake by the intestinal tract. The mixture is dry blended again until the milling action reduces the particle size to less than 50 $\mu$m. Thereafter, the mixture is dissolved to a final volume of 100 mL. Measurement of the osmolarity of the final mixture is made on a Roebling Micro-Osmometer.

Example 4

5.0 to 11.34 g of trehalose dihydrate is again dry blended at an rpm greater than 18,000 until the consistency is a uniform powder. Between 100 and 500% of the recommended daily allowance of vitamins and minerals is added to the trehalose powder. An effective amount of sodium chloride and potassium phosphate are added in order to increase the fluid uptake by the intestinal tract. The mixture is dry blended again until the milling action reduces the particle size to less than 50 $\mu$m. Thereafter, the mixture is dissolved to a final volume of 100 mL. An amount of color additives effective to improve the visual appeal of the final product is added. Flavor additives are also added in an amount necessary to provide a palatable taste. Measurement of the osmolarity of the final mixture is made on a Roebling Micro-Osmometer.

Example 5

The solutions prepared by the examples 1 through 4, may then be carbonated using conventional techniques known in the art.

Although the foregoing invention has been described in some detail by way of illustration and example for purposes of clarity of understanding, it will be apparent to those skilled in the art that certain changes and modifications may be practiced. Therefore, the description and examples should not be construed as limiting the scope of the inventions, which is delineated by the appended claims.

What is claimed is:

1. A sports beverage composition comprising water and trehalose in solution, wherein the water is at least one of sterilized, filtered, distilled, deionized, or carbonated, the composition further comprising an amino acid and a saccharide, wherein the trehalose and the saccharide are present in amounts sufficient to obtain an isotonic or hypotonic solution, and wherein the saccharide is selected from the group consisting of glucose, fructose, mannose, galactose, sucrose, maltose, lactose, maltodextrins and glucose polymers, and wherein the amount of trehalose is about 5 to 11.34 g per 100 mL of water.

2. The sports beverage composition according to claim 1 further comprising coloring, flavoring or a nutrient selected from the group consisting of saccharides, vitamins, minerals, amino acids, peptides, and proteins.

3. A sports beverage composition comprising water, an amino acid, and trehalose in solution wherein the trehalose is present in an amount sufficient to obtain an isotonic or hypotonic solution upon dilution of an aliquot of the sports beverage composition in a premeasured amount of water to produce a concentration of trehalose of about 5 to 11.34 g per 100 mL of water.

4. The composition according to claim 3 further comprising saccharides in amounts sufficient to obtain an isotonic or hypotonic solution.

5. The composition according to claim 4 wherein the saccharides are selected from the group consisting of glucose, fructose, mannose, galactose, sucrose, maltose, lactose, maltodextrins and glucose polymers.

6. The sports beverage composition according to claim 3 further comprising coloring, flavoring or a nutrient selected from the group consisting of saccharides, vitamins, minerals, amino acids, peptides, and proteins.

7. A composition for making a sports beverage comprising, in dried form, trehalose, an amino acid, and a nutrient selected from the group consisting of saccharides, vitamins, minerals, peptides, and proteins, wherein an aliquot of the composition dissolved in a premeasured amount of water to produce a concentration of trehalose of about 5 to 11.34 g per 100 mL of water provides an isotonic or hypotonic solution.

8. The composition according to claim 7 wherein the mixture is in the form of a powder.

9. The composition according to claim 7 wherein the mixture is in the form of a tablet.

10. The composition according to claim 7 wherein the nutrient is a saccharide in an amount sufficient to obtain an hypotonic or hypotonic solution.

11. The composition according to claim 10 wherein the saccharide is selected from the group consisting of glucose, fructose, mannose, galactose, sucrose, maltose, lactose, maltodextrins and glucose polymers.

12. The composition according to claim 7 further comprising coloring or flavoring.

13. A method of producing a dried composition for preparation of a sports beverage comprising the steps of:

dissolving in water trehalose, an amino acid, and a nutrient selected from the group consisting of saccharides, vitamins, minerals, amino acids, peptides, and proteins; and drying the solution, wherein dissolving an aliquot of the dried solution in a premeasured amount of water to produce a concentration of trehalose of about 5 to 11.34 g per 100 mL of water provides an isotonic or hypotonic solution.

14. The method according to claim 13 further comprising the step of forming the dried solution into a tablet form.

15. The method according to claim 13 Wherein the drying is by spray drying, freeze drying, fluidized bed drying or critical fluid extraction.

16. The method according to claim 14 further comprising addition of a coloring or flavoring.

17. A carbohydrate based sports drink composition suitable for oral ingestion in the form of a substantially isotonic solution comprising, in water, a carbohydrate, and an amino acid, wherein trehalose provides the major proportion of the carbohydrate present and the amount of trehalose is about 5 to 11.34 g per 100 mL of water.

18. The composition according to claim 17, wherein the water is sterilized, filtered, distilled, de-ionized, or carbonated.

19. A method of producing a sports drink composition as claimed in claim 17, which method comprises dissolving trehalose and an amino acid, wherein the amounts of trehalose is selected such that dissolving an aliquot of the dried composition in water provides a substantially isotonic solution suitable for oral ingestion.

20. The method according to claim 19, wherein the trehalose has been premixed to give a dry powder containing the desired proportions of trehalose and other ingredients.

21. The method according to claim 19 or 20, wherein the composition further contains a nutrient selected from the group consisting of saccharides, vitamins, minerals, amino acids, peptides, and proteins.

22. The composition according to claim 17, wherein the composition further contains a nutrient selected from the group consisting of saccharides, vitamins, minerals, amino acids, peptides, and proteins.

23. The sports beverage of claim 1, wherein the water is distilled and deionized.

24. The composition of claim 17, wherein the water is distilled and deionized.

25. The composition of claim 17, further comprising one or more saccharides other than trehalose selected from the group consisting of glucose, fructose, mannose, galactose, sucrose, maltose, lactose, maltodextrins and glucose polymers.

26. The composition of claim 17, further comprising a coloring, flavoring or nutrient, or combination thereof.

27. The sports drink composition of claim 17, wherein the drink composition is provided in commercial from as a ready-to-drink beverage.

28. The sports drink composition of claim 17, wherein the drink composition is package as a ready-to-drink beverage.

29. The sports drink composition of claim 28, wherein the drink composition is carbonated.

30. A method of administering a carbohydrate to an individual, the method comprising orally administering a composition of claim 17 to the individual.

* * * * *